United States Patent
Clausen et al.

(10) Patent No.: US 12,293,017 B2
(45) Date of Patent: May 6, 2025

(54) METHOD AND SYSTEM FOR GUIDING A USER IN CALIBRATING AN EYE TRACKING DEVICE

(71) Applicant: TOBII AB, Danderyd (SE)

(72) Inventors: Anders Clausen, Danderyd (SE); Mathias Mobrin, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 18/670,758

(22) Filed: May 22, 2024

(65) Prior Publication Data

US 2024/0393873 A1    Nov. 28, 2024

(30) Foreign Application Priority Data

May 25, 2023   (SE) ................... 2350642-1

(51) Int. Cl.
| | |
|---|---|
| *G06F 3/01* | (2006.01) |
| *G06F 3/04817* | (2022.01) |
| *G06F 3/04845* | (2022.01) |
| *G06T 7/20* | (2017.01) |
| *G06T 7/73* | (2017.01) |
| *G06T 7/80* | (2017.01) |

(52) U.S. Cl.
CPC .............. *G06F 3/013* (2013.01); *G06F 3/012* (2013.01); *G06F 3/016* (2013.01); *G06F 3/04817* (2013.01); *G06F 3/04845* (2013.01); *G06T 7/20* (2013.01); *G06T 7/74* (2017.01); *G06T 7/80* (2017.01); *G06T 2207/30201* (2013.01); *G06T 2207/30204* (2013.01)

(58) Field of Classification Search
CPC ............ G06F 3/013; G06F 3/012; G06T 7/80

USPC ............................................ 345/156
See application file for complete search history.

(56) References Cited

U.S. PATENT DOCUMENTS

| | | | |
|---|---|---|---|
| 10,307,053 B2 | 6/2019 | Fayolle | |
| 11,106,280 B1 | 8/2021 | Bigham et al. | |
| 2014/0085198 A1 | 3/2014 | Jahnke et al. | |
| 2014/0021828 A1 | 8/2014 | Amayeh et al. | |
| 2015/0049201 A1 | 2/2015 | Liu et al. | |

(Continued)

OTHER PUBLICATIONS

Project Aria Tools Website as of May 31, 2024, https://facebookresearch.github.io/projectaria_tools/docs/ARK/mps/eye_gaze_calibration.

(Continued)

*Primary Examiner* — Calvin C Ma
(74) *Attorney, Agent, or Firm* — Christopher Ignatius Moylan

(57) ABSTRACT

A computer-implemented method for guiding a user in calibrating a wearable eye tracking device is disclosed. The method comprises determining a calibration point and an initial gaze point of a user wearing the eye tracking device. The method further comprises displaying a calibration marker on a remote display device at the initial gaze point, wherein the calibration marker is configured to indicate a direction. The method further comprises, in response to a movement of the gaze point in relation to the calibration point caused by movement of the user's head and/or movement of the remote display device, determining a current gaze point, and updating the calibration marker in accordance with a calculated direction and/or the distance from the current gaze point to the calibration point.

20 Claims, 7 Drawing Sheets

(56) References Cited

U.S. PATENT DOCUMENTS

| | | | | |
|---|---|---|---|---|
| 2015/0085251 A1* | 3/2015 | Larsen | ............... | G06F 3/013 |
| | | | | 351/206 |
| 2016/0134863 A1* | 5/2016 | Horesh | ............ | G06V 10/761 |
| | | | | 348/78 |
| 2019/0011983 A1 | 1/2019 | Yasuda et al. | | |
| 2019/0018487 A1 | 1/2019 | Tsurumi | | |
| 2020/0218345 A1 | 7/2020 | Liu et al. | | |

OTHER PUBLICATIONS

European Search Report regarding EP App. No. 24 17 6030 dated Oct. 10, 2024.
Swedish Search Report regarding SE App. No. 2350642-1 dated Jan. 10, 2024.

\* cited by examiner

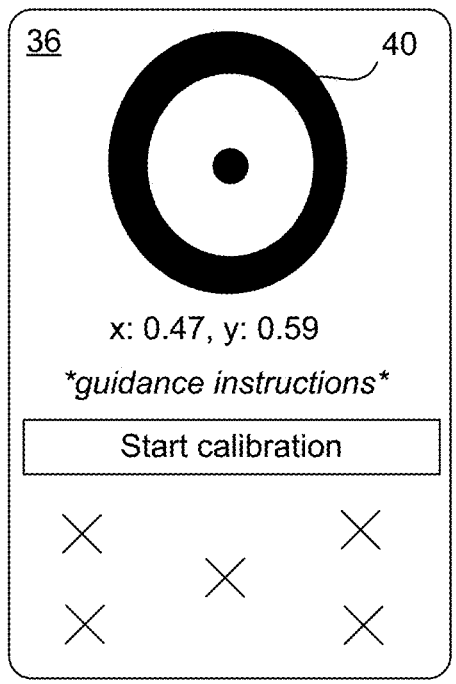
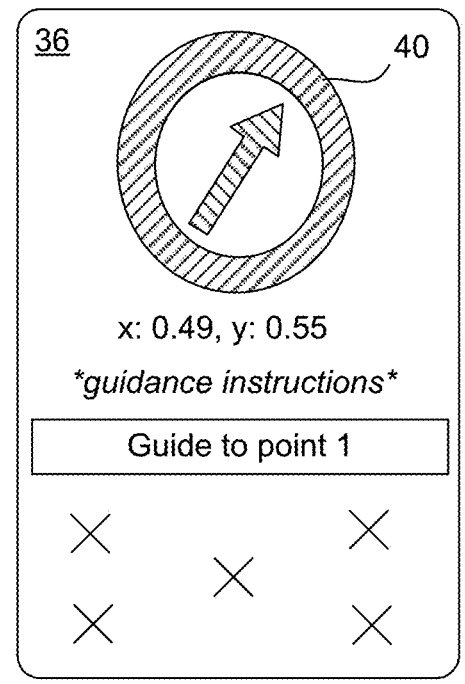
FIG. 4A　　　　　　　　　FIG. 4B
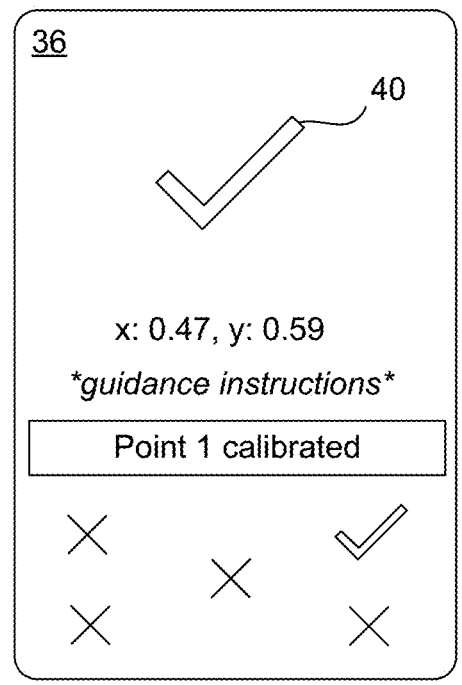
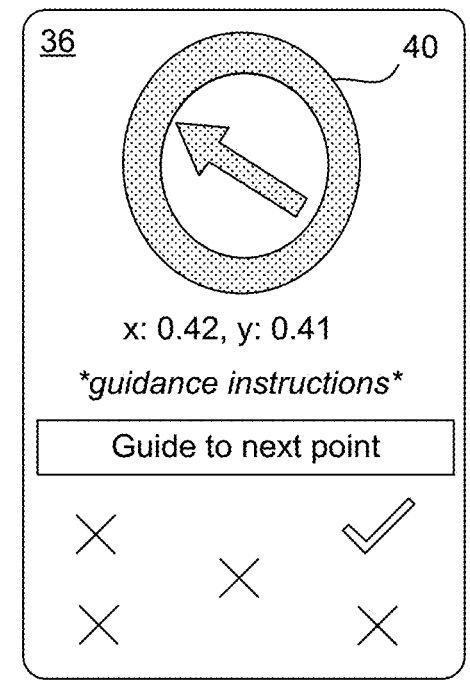
FIG. 4C　　　　　　　　　FIG. 4D

METHOD AND SYSTEM FOR GUIDING A USER IN CALIBRATING AN EYE TRACKING DEVICE

CROSS-REFERENCE TO RELATED APPLICATION

The present application claims priority to Swedish patent application No. 2350642-1, filed 25 May 2023, entitled "Method and System for Guiding a User in Calibrating an Eye Tracking Device," and is hereby incorporated by reference in its entirety.

TECHNICAL FIELD

This disclosure generally relates to the field of eye tracking. In particular, this disclosure relates to guiding a user in calibrating an eye tracking device.

BACKGROUND

Eye tracking technology is used in various fields such as psychology, neuroscience, market research, computer-generated reality, user interface design, gaming, and so forth. Eye tracking involves monitoring and recording the movements of a person's eyes as they look at different objects or stimuli to enhance user experience and provide more intuitive ways of interacting with technology.

Calibration of an eye tracking device is a crucial aspect of eye tracking technology as it ensures accurate tracking of eye movements. Due to natural variations between users, for example in the shape and geometry of the eyes, eye movement behavior in terms of e.g., speed and gaze, and other such factors, a calibration procedure must be implemented to account for these factors and thus optimize eye tracking algorithms for a particular user. Calibration is typically done by looking at a given set of reference points for a certain amount of time and acquiring data related to the gaze direction of the user. Once the set of reference points have been looked upon by the user, a calibration profile is established defining the characteristics of at least one of the user's eyes. This calibration profile may contain data on the characteristics of the user's eye(s), for instance, the interocular distance (IOD), inter-pupillary distance (IPD), pupil size, pupil size variations, bright pupil contrast, dark pupil contrast, corneal radius, and the like. This information may be pre-existing in the calibration profile or may be incorporated into the calibration profile at the time of analysis. Alternatively, default parameters may be stored in the eye tracker to serve as an initial starting point.

Many calibration procedures require a human operator to instruct a user in performing the calibration of the eye tracking device, for instance by instructing the user to look at certain calibration points in a particular order. This can be especially difficult for multi-point calibration, since a calibration marker may require positioning in peripheral areas that the user cannot reach directly with their gaze.

The present inventors have identified limitations concerning calibration procedures known in the art, especially concerning eye tracking devices that do not incorporate displays. These devices may be referred to as "display-less" in the sense that they do not have displays attached thereto that are capable of presenting calibration markers viewable by the user wearing the eye-tracking device. To this end, calibration of display-less eye tracking devices requires meticulous guiding strategies that often underperform in terms of e.g. accuracy and speed.

Improvements related to guiding a user in calibrating an eye tracking device are accordingly presented in the present disclosure.

SUMMARY

This disclosure attempts to solve the problems noted above, as well as other related problems envisaged by the skilled person, by providing ways of guiding the user in calibrating the eye tracking device.

According to a first aspect of the disclosure, there is provided a computer-implemented method for guiding a user in calibrating a wearable eye tracking device, the method comprising: determining a calibration point in a first fixed coordinate system associated with a scene camera of the eye tracking device; determining an initial gaze point of a user wearing the eye tracking device, the initial gaze point being determined in the first fixed coordinate system, and being determined in a second fixed coordinate system associated with a remote display device when the second fixed coordinate system overlaps with the first fixed coordinate system; calculating a first direction and a first distance from the initial gaze point to the calibration point in the first fixed coordinate system; displaying a calibration marker on the remote display device at the initial gaze point, wherein the calibration marker is configured to indicate the first direction; in response to a movement of the gaze point in relation to the calibration point caused by movement of the user's head while wearing the eye tracking device and/or movement of the remote display device: determining a current gaze point in the first fixed coordinate system; calculating a second direction and a second distance from the current gaze point to the calibration point in the first fixed coordinate system; and updating the calibration marker in accordance with the second direction and/or the second distance.

Optionally, updating the calibration marker comprises changing an appearance of the calibration marker depending on a change in the second direction and/or the second distance. Optionally, changing the appearance of the calibration marker comprises: reducing a size of the calibration marker upon the second distance being smaller than the first distance, and enlarging the calibration marker upon the second distance being larger than the first distance; and/or recoloring the calibration marker upon the second distance being different from the first distance. Optionally, changing the appearance of the calibration marker comprises changing a graphical icon of the calibration marker upon the second distance being within a calibration distance of the calibration point.

Optionally, the method further comprising, in response to the movement of the gaze point in relation to the calibration point, providing additional feedback to the user, said additional feedback being one or more of: a haptic feedback, a visual feedback, or an audio feedback in accordance with the second direction and/or the second distance.

Optionally, the method further comprising performing a calibration of the eye tracking device with respect to the calibration point upon the second distance being within a calibration distance of the calibration point.

Optionally, performing the calibration depends on the user's gaze being maintained within a calibration margin of the calibration distance until a predetermined condition is met. Optionally, the calibration distance and the calibration margin are different radiuses of substantially circular shapes having their respective centers at the calibration point. Optionally, the predetermined condition is a number of frames captured by a scene camera of the eye tracking device and/or a fixation time. Optionally, the method further comprising, as a response to performing the calibration of the eye tracking device with respect to the calibration point, for one or more consecutive calibration points: calculating a next direction and a next distance from the current gaze point to one of the consecutive calibration points; and updating the calibration marker in accordance with the next direction and/or the next distance. Optionally, the method further comprising determining a user calibration profile of the user of the eye tracking device as a result of performing the calibration of the calibration point and the one or more consecutive calibration points.

Optionally, the user's head remains substantially fixed while wearing the eye tracking device. Optionally, the eye tracking device is a display-less eye tracking device.

According to a second aspect of the disclosure, there is provided a computer-readable storage medium having stored thereon computer-executable instructions that, when executed by processing circuitry cause the processing circuitry to carry out the method of the first aspect.

According to a third aspect of the disclosure, there is provided an eye tracking system comprising a wearable eye tracking device, a remote display device, processing circuitry and a memory containing instructions executable by said processing circuitry, wherein the eye tracking device comprises a scene camera and an eye tracking camera, The processing circuitry is configured to: determine a calibration point in a first fixed coordinate system associated with the scene camera; determine an initial gaze point of a user wearing the eye tracking device using the eye tracking camera and the scene camera, the initial gaze point being determined in the first fixed coordinate system, and being determined in a second fixed coordinate system associated with the remote display device when the second fixed coordinate system overlaps with the first fixed coordinate system; calculate a first direction and a first distance from the initial gaze point to the calibration point in the first fixed coordinate system; cause the remote display device to display a calibration marker at the initial gaze point, wherein the calibration marker is configured to indicate the first direction; in response to a movement of the gaze point in relation to the calibration point caused by movement of the user's head while wearing the eye tracking device and/or movement of the remote display device: determine a current gaze point in the fixed coordinate system; calculate a second direction and a second distance from the current gaze point to the calibration point in the first fixed coordinate system; and cause the remote display device to update the calibration marker in accordance with the second direction and/or second distance.

Further possible features and benefits of this solution will become apparent from the detailed description below.

BRIEF DESCRIPTION OF THE DRAWINGS

The solution will now be described in more detail by means of exemplary embodiments and with reference to the accompanying drawings, in which:

FIGS. 4A-H are exemplary illustrations of how a user may be guided in calibrating an eye tracking device.

DETAILED DESCRIPTION OF EMBODIMENTS

Figure 1:
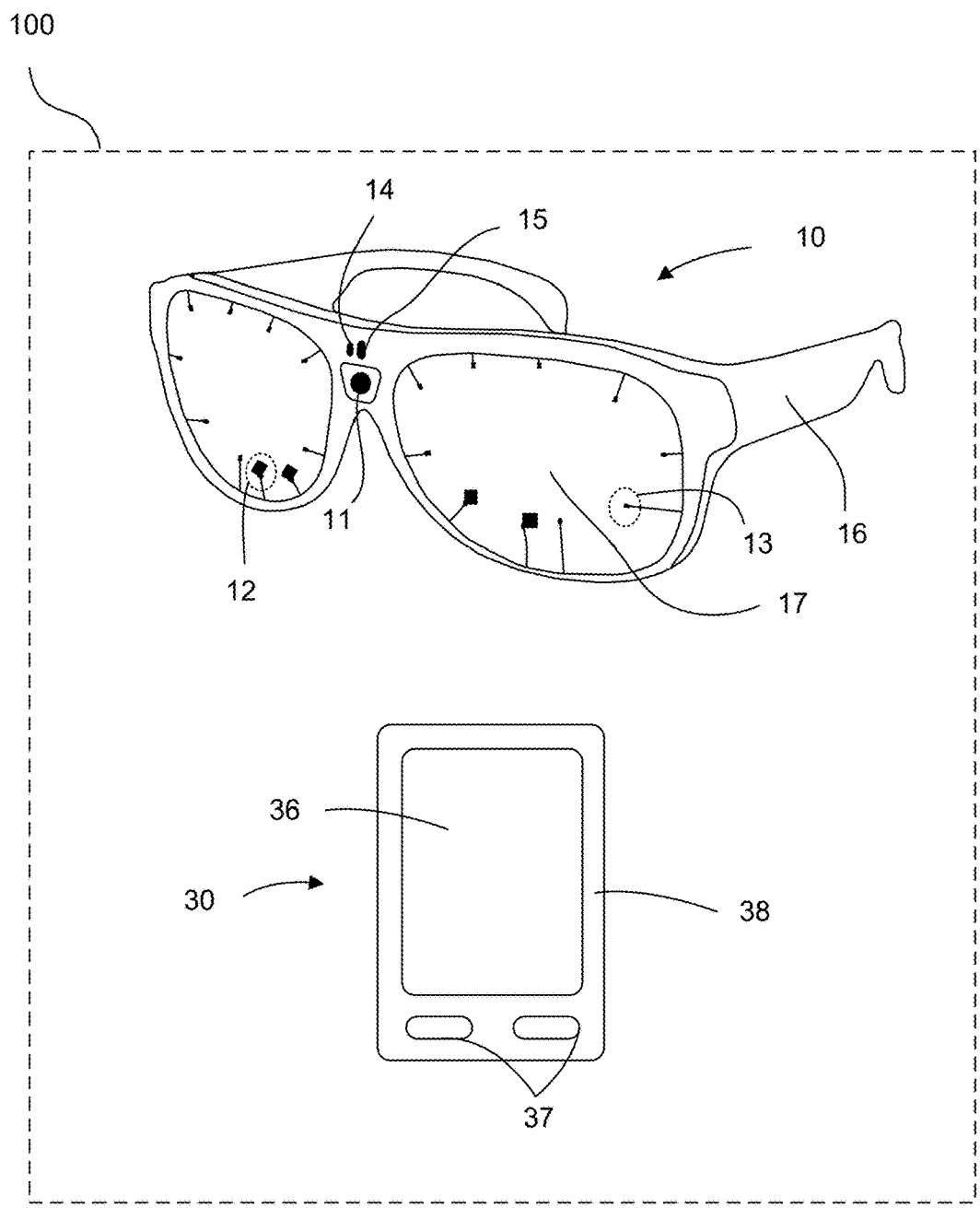
FIG. 1 is an exemplary perspective view of an eye tracking system including an eye tracking device and a remote display device.

Wearable eye tracking devices are devices capable of being worn by a user, typically taking the form of a pair of glasses, head-mountable displays, helmet, and/or the like. Such glasses may incorporate various forms of sensors, displays, and/or electronics. For example, a wearable device may contain an image sensor for capturing images or video of a scene around a user. Such devices may alternatively be referred to as eye tracking glasses. One particular type of glasses are the Tobii Pro Glasses 3, offered for sale by Tobii AB, Danderyd, Stockholm, Sweden. This device includes an outward-facing image sensor, or scene camera, in combination with an eye tracking arrangement. It is therefore possible to combine images captured by the scene camera with information from the eye tracking arrangement, to determine where in a particular scene a user is looking. It is appreciated that any alternative type (or future generation) of display-less eye tracking devices may be suitable in this regard.

Although the disclosure is especially suitable for display-less eye tracking devices, it is appreciated that the methods and approaches disclosed herein may be applied to any type of eye tracking device known in the art, and not just display-less eye tracking devices. Such eye tracking devices may include displays being e.g., liquid-crystal displays (LCD) or LED displays, however other types of displays may also be envisaged. The display may be a virtual reality (VR) or augmented reality (AR) display as known in the art. By way of example, it may be desired to calibrate an eye tracking device with respect to one or more additional displays. In other examples, a display of an eye tracking device may be malfunctioning for various reasons and thus require a different calibration approach other than presenting calibration markers on the display thereof. In further examples, the present approach may be used to optimize performance by minimizing resource utilization, or reduce/ optimize memory usage of the eye tracking device. In yet other examples, it may be desired to calibrate an eye tracking device using another approach for e.g., research or testing purposes. Clearly, other related areas of application may be envisaged for using the approaches disclosed herein, none of which are to be construed as limiting to the scope.

For calibration of a display-less eye tracking device, existing solutions require the user or an instructor to position a calibration marker such that it is visible to a scene camera of the device. In order to calibrate the device, the calibration marker should preferably be visible in a predefined area of an image captured by the scene camera, and its location depends on whether the calibration is a single-point calibration or a multi-point calibration. For example, in single-point calibration, the calibration marker is typically centered in the image. In multi-point calibration, such as five-point calibration, the calibration marker may be positioned in the center of the image as well as near the center of the four quadrants of the image. If the instructor is assisting the user with a single-point calibration, the instructor may view a live stream of images captured by the scene camera to see whether the single calibration point is close to the center of the image. For multi-point calibration, however, this is difficult as the instructor needs to instruct the user to keep their head still while following the calibration marker with their gaze as the instructor moves the calibration marker to the desired location. It becomes even more difficult in cases where the user is performing the calibration themselves, especially in multi-point calibration, since the calibration marker may need to be positioned at locations in the periphery of the video that are comprehended by the user, although not directly reachable with its gaze. Hence, the present disclosure provides improvements in this regard, i.e., to accurately guide a user in calibrating an eye tracking device, for example a display-less eye tracking device.

With reference to FIG. 1, an exemplary eye tracking system 100 is shown. The eye tracking system 100 may be used for applying the methods and approaches herein. The eye tracking system 100 comprises an eye tracking device 10 and a remote display device 30.

The eye tracking device 10 is in this particular example a pair of wearable eye tracking glasses 10. For reasons of brevity, the pair of wearable eye tracking glasses 10 will hereinafter be referred to as glasses 10. The glasses 10 comprise a frame 16 and two lenses 17 attached to the frame 16. The frame 16 may be wearable by a user as a traditional pair of glasses would be used. The lenses may be anti-reflective and/or scratch resistant, such as polycarbonate lenses, trivex lenses, high-index lenses, photochromic lenses, glass lenses or blue-light-blocking lenses. The lenses 17 may comprise a transparent plate that enables the user to see beyond the glasses 10. The transparent plate may be flat or curved. The transparent plate may be made of glass, acrylic, or any other suitable material. Separate transparent plates may be employed for the left and right eyes of the user, or the glasses 10 may comprise a single lens 17 for both eyes.

The glasses 10 comprise an outward-facing image sensor, or scene camera 11. The scene camera 11 is configured to capture images including at least one scene image of the environment around a user wearing the glasses 10. A captured scene image may be a still image or video images. The scene camera 11 may be, for example, a charge-coupled device (CCD) camera or complementary metal oxide semi-conductor (CMOS) camera. The scene camera 11 may comprise an integrated circuit containing an array of pixel sensors, each pixel sensor containing a photodetector and an active amplifier. The scene camera 11 is capable of converting light into digital signals. As an example, the scene camera 11 may be a near-infrared (NIR) image sensor, an RGB sensor, an RGBW sensor, or an RGB or RGBW sensor with an IR filter. Other types of image sensors may also be envisaged. The scene camera 11 may be a high-resolution camera, e.g., full HD, 2K or 4K. The field of view of the scene camera 11 may vary depending on whether the scene camera 11 is adapted for narrow field of view of wider field of view. The field of view may be a combined field of view of two or more separate fields of view. Generally, the combined or single field of view is typically between 40° and 120°. More preferably, the combined or single field of view is between 8° and 120°. More preferably, the combined or single field of view is between 100° and 110°. In one particularly advantageous example, the combined field of view is 106°.

The glasses 10 comprises an eye tracking arrangement. The eye tracking arrangement comprises at least one eye camera 12 and at least one illuminator 13. In this particular example, each lens 17 comprises two eye cameras 12 that are integrated into the respective lens 17, although variations may be envisaged. The eye cameras 12 are adapted to capture images of the eyes of the user wearing the glasses 10 for use in determining a gaze of the user in terms of a gaze vector, a gaze direction and/or gaze point. The eye cameras 12 may be adapted to relay information to processing circuitry (not shown) for processing thereof. The glasses 10, and more specifically the eye tracking arrangement thereof, further comprises one or more illuminators 13. In this particular example, each lens 17 comprises eight illuminators 13, although variations may be envisaged. The illuminators 13 are configured to illuminate an eye of the user. The illuminators 13 may be, for example, infrared or near infrared illuminators, for example in the form of light emitting diodes (LEDs). However, other types of illuminators 13 may also be envisaged. The eye tracking arrangement can be employed for eye tracking for both eyes, or there may be separate arrangements for the left and right eyes. Eye tracking may be performed to estimate a position of a part of an eye and/or a gaze of the user for the left and right eyes separately.

As also shown in FIG. 1, the glasses optionally comprise further units. These units include an inertial measurement unit (IMU) 14 comprising one or more accelerometers, gyroscopes or magnetometers, as well as a microphone 15. Other additional electronic units not shown in FIG. 1 may also be included in the glasses 10, such as speaker units, light emitting units and/or haptic emitter units. These additional electronic units may be employed for providing additional feedback to the user in various settings as will be further discussed in this disclosure.

The remote display device 30 may be any suitable display device known in the art such as a smartphone, tablet, smartwatch, laptop, or generally any type of device capable of displaying information. The remote display device 30 comprises a display 36, such as an LCD or LED screen attached to a main device housing 38. The display 36 may include a touch screen through which a user can make an input. The remote display device 30 may also comprise one or more separate input elements 37. The display 36 may comprise graphical user interface (GUI) through which visual information may be presented to the user wearing the glasses 10. In addition to visual information and feedback, the remote display device 30 may be configured for providing other types of feedback, such as haptic or audio feedback.

Although not shown in FIG. 1, the eye tracking system 100 comprises processing circuitry and a memory containing instructions executable by said processing circuitry. The processing circuitry and the memory may be communicatively coupled with the glasses 10 and the remote display device 30, for example via a suitable wired or wireless connection. Information retrieved by the scene camera 11 and the eye cameras 12 may be relayed between the cameras 11, 12 and the processing circuitry/memory. The processing circuitry is configured for performing different functions associated with the eye tracking calibration. The processing circuitry may be implemented in any known controller technology, including but not limited to microcontroller, processor (e.g., PLC, CPU, DSP), FPGA, ASIC or any other suitable digital and/or analog circuitry capable of performing the intended functionality. The memory may be implemented in any known memory technology, including but not limited to E (E) PROM, S (D) RAM or flash memory. In some embodiments, the memory may be integrated with or internal to the processing circuitry. The processing circuitry and/or the memory may be incorporated into the glasses 10 and/or the remote display device 30 and/or into a remote processing device, such as a cloud-based computing resource (not shown).

The cloud-based computing resource may be hosted on a cloud-based server being implemented using any commonly known cloud-computing platform technologies, such as Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publicly available, or alternatively limited to an enterprise. Alternatively, the server may in some embodiments be locally managed as e.g. a centralized server unit. The cloud-based computing resource may be in communicative operation with the cloud-based storage resource operating as the memory. The cloud-based storage resource may be maintained by and/or configured as a cloud-based service, being included with or external to the cloud-based computing resource. Connection to cloud-based storage means may be established using DBaaS (Database-as-a-service). For instance, cloud-based storage means may be deployed as a SQL data model such as MySQL, PostgreSQL or Oracle RDBMS. Alternatively, deployments based on NoSQL data models such as MongoDB, Amazon DynamoDB, Hadoop or Apache Cassandra may be used. DBaaS technologies are typically included as a service in the associated cloud-computing platform.

In view of the above, functions associated with the calibration procedure may be carried out by processing circuitry in either one of the glasses 10, the remote display device 30 or the remote processing device.

Figure 2:
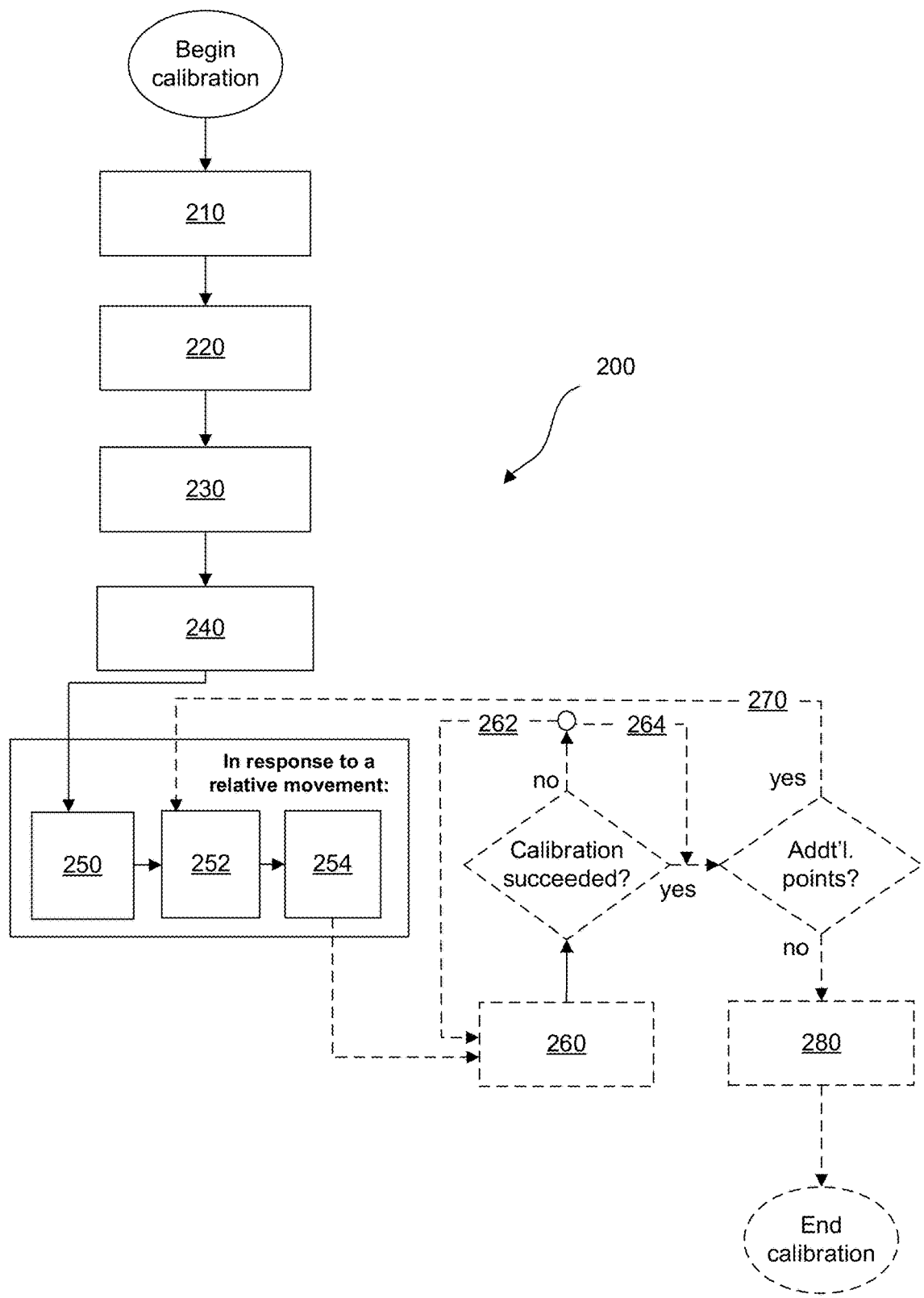
FIG. 2 is an exemplary flowchart of a method for guiding a user in calibrating an eye tracking device.

With reference to FIG. 2, a flowchart of a computer-implemented method 200 is shown for guiding a user in calibrating an eye tracking device, such as the glasses 10 disclosed with reference to FIG. 1. To this end, the method 200 may be implemented by the eye tracking system 100. In particular, the method 200 assists the user in moving their gaze to a desired calibration point so that an associated calibration of the eye tracking device can be performed.

The method 200 involves a step 210 of determining a calibration point and a step 220 of determining an initial gaze point in the field of view of the scene camera 11. A first distance and a first direction are then calculated at step 230 between these points. When the remote display device 30 is within the field of view of the scene camera 11, a calibration marker is displayed at step 240 on the remote display device 30 at the initial gaze point. The calibration marker is configured to indicate the first direction (i.e. the direction from the initial gaze point to the calibration point). By displaying at step 240 the calibration marker at the initial gaze point, the calibration marker will appear at the location on the remote display device 30 where the user is directing their gaze. This is particularly advantageous since the user is not required to find the calibration marker on the remote display device 30, since it will be provided at the initial gaze point of the user.

The user follows the indication of the first direction provided by the calibration marker by causing a relative movement between the initial gaze point and the calibration point while maintaining their gaze point at the calibration marker. How this can be achieved will be explained below. As a result, the gaze point will travel towards the calibration point while at the same time being maintained at the calibration marker. This is a direct consequence of the calibration marker being displayed at step 240 at the gaze point of the user. As the gaze point travels towards the calibration point, the location of the gaze point is updated. That is to say, during said relative movement between the initial gaze point and the calibration point, the method 200 involves determining updated positions of the gaze point. This can be performed repeatedly or periodically during the movement, such that a current gaze point is determined at step 250 at each timestep. At each timestep, the direction and distance from the current gaze point to the calibration point are calculated at step 252. These will be referred to as a second direction and a second distance. Moreover, during said movement, the method 200 involves updating at step 254 the calibration marker in accordance with the direction and/or the distance.

The movement of the gaze point and consequently the calibration marker towards the calibration point can be caused by a movement of the remote display device 30 and/or a movement of the user's head while wearing the glasses 10. Three different approaches are therefore realized for causing the relative movement. The first approach involves maintaining the user's head wearing the glasses 10 in a substantially fixed position while moving the remote display device 30. The second approach involves maintaining the remote display device 30 in a substantially fixed position while moving the user's head wearing the glasses 10. The third approach is a combination of the first and second approaches, where the user's head wearing the glasses 10 is moved at the same time as the remote display device is moved.

The terms used herein should be carefully considered as they refer to different steps in the procedure. For example, the term "initial" with regards to the initial gaze point shall be interpreted in contrast to the term "current" with regards to the current gaze point. The initial gaze point is determined before the relative movement as explained herein has been caused, whereas the current gaze point is determined after the relative movement has been caused. Importantly, the term "initial" in this context does not necessarily mean "first" in the entire guiding and calibration procedure. It shall thus be understood that the initial gaze point may be determined for either a first or any number of consecutive gaze points in a single or multi-point calibration context.

The term "first" with regards to the first direction/distance shall be interpreted in contrast to the term "second" with regards to the second direction/distance. The first direction/distance is determined before the relative movement explained herein has been caused, whereas the second direction/distance is determined after the relative movement has been caused. Similar to the gaze point, the first/second direction/distance may be determined for either a first or any number of consecutive calibration/gaze points in a single or multi-point calibration context.

In addition to steps 210, 220, 230, 240, 250, 252, 254 of the method 200 for guiding the user in calibration the glasses 10, the method 200 optionally involves further actions as seen in FIG. 2. These are depicted in dotted lines, and are related to the actual calibration of the glasses 10 with respect to the calibration point rather than the guiding procedure. The method 200 may further comprise performing at step 260 a calibration upon the gaze point being within a predetermined calibration distance of the calibration point. Details of this procedure will be further discussed later in with reference to FIGS. 3A-D. If the calibration fails, the method 200 may involve one or more further attempts of performing at step 262 the calibration. Alternatively, the method 200 may involve omitting at step 264 the calibration for that particular calibration point.

The method 200 may further involve, as a response to performing at step 260 the calibration, repeating at step 270 the guiding procedure and optionally also the calibration procedure for one or more additional/consecutive calibration points. This corresponds to a multi-point calibration. To this end, a next direction and a next distance are calculated from the current gaze point to one of the additional calibration points, and the calibration marker is updated accordingly using the same or any alternative or similar approach as discussed with respect to updating the calibration marker when guiding the user in calibrating the glasses 10.

Finally, once the glasses 10 have been calibrated with respect to all of the points in the present calibration context, be it single-point calibration or multi-point calibration, the method 200 may further involve a step of determining at step 280 a user calibration profile. The user calibration profile is thus based on the data collected from the eyes in response to the calibration(s) of the calibration point(s). Determining at step 280 the user calibration profile may involve using techniques readily known in the art as discussed in the Background section. For instance, the user calibration profile may include characteristics of the user's eye(s), such as the interocular distance (IOD), inter-pupillary distance (IPD), pupil size, pupil size variations, iris properties, corneal radius, cornea topographical profile and/or predicted blink pattern and the like.

More detailed explanations of the steps of the method 200 as seen in FIG. 2 will now be made with further reference to FIGS. 3A-D. FIGS. 3A-D, which are exemplary illustrations of the calculation of distances and directions from a marker position to a calibration position for guiding a user in calibrating an eye tracking device.

In FIGS. 3A-D, a number of fixed coordinate systems are defined. A first fixed coordinate system corresponds to images captured by the scene camera 11 of the glasses 10, as discussed above in relation to FIG. 1. A second fixed coordinate system corresponds to the remote display device 30, in particular the display 36 of the remote display device 30. During the method 200, the remote display device 30 should be maintained within the field of view of the scene camera 11. The field of view of the scene camera 11 will generally be larger than the remote display device 30 (with the conceivable exception that the remote display device 30 is very close to the scene camera 11, although this would make the guiding/calibration infeasible). To this end, the second fixed coordinate system overlaps with, and may be contained within, the first fixed coordinate system when the remote display device 30 is in the field of view of the scene camera 11. The overlap is seen in FIGS. 3A-D, i.e., the first fixed coordinate system defined by the images captured by the scene camera 11 encompasses the entire second fixed coordinate system defined by the remote display device 30, or at least a portion thereof.

The second fixed coordinate system may be normalized to account for the aspect ratio of the scene camera 11. The normalized fixed coordinate system may help in assuring that the fixed coordinate system is consistent and compatible with the measurements and data captured by the scene camera 11. The normalization of the fixed coordinate system may be performed using any suitable technique, such as scaling and/or translating the fixed coordinate system so that it aligns with the captured images by e.g., adjusting the origin of the fixed coordinate system as well as the scale of the axes. For example, the width of an image captured by the scene camera 11 is typically larger than the height of the image, such as a full HD image (1920×1080). In this case, the normalization of the second fixed coordinate system may be carried out to compensate for the discrepancies between the width and the height.

In reality, a third fixed coordinate system, not shown in FIGS. 3A-D, could possibly be conceived, corresponding to the field of view of the user. The third fixed coordinate system has a predetermined relationship with the first fixed coordinate system, as the scene camera 11 is at a substantially fixed position relative to the user's head when the user is wearing the glasses 10, and so images captured by the scene camera 11 will change in response to movement of the user's head and thus the field of view of the user.

Figure 3A:
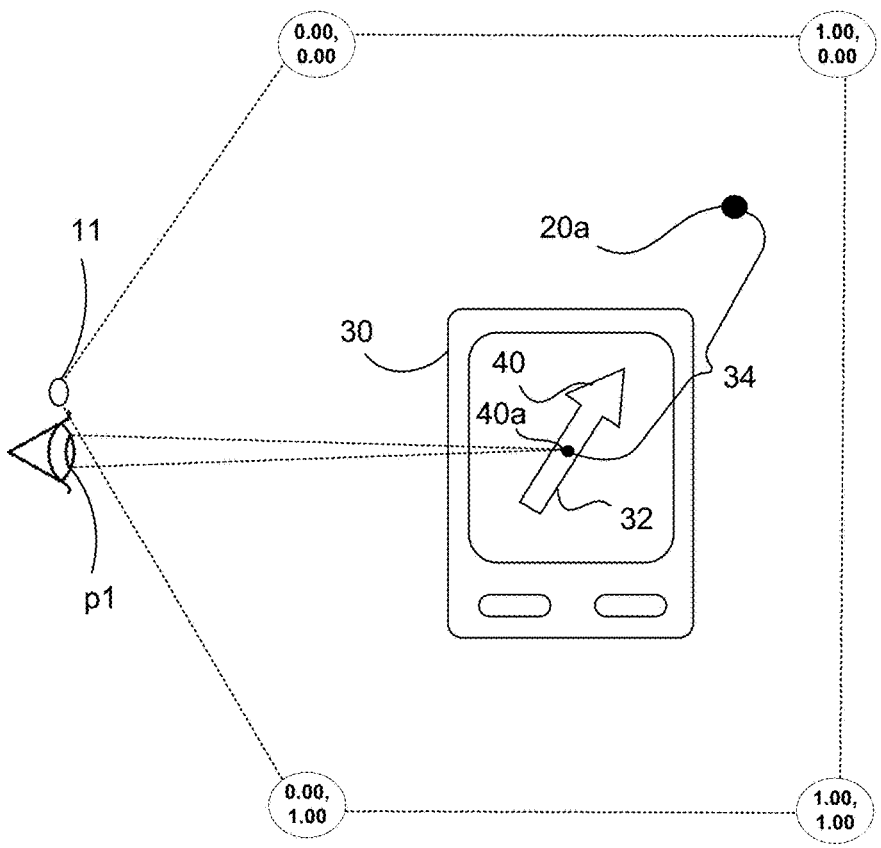
FIGS. 3A-D are exemplary illustrations of calculation of distances and directions from a marker position to a calibration position for guiding a user in calibrating an eye tracking device.

With reference to FIG. 3A, step 210 may involve establishing the coordinates of a calibration point 20a in the first fixed coordinate system. The calibration point 20a is fixed with respect to the first fixed coordinate system. That is to say, the calibration point 20a is fixed with respect to the scene camera 11 and, by association, the field of view of the user. The purpose of the fixation of the calibration point 20a in this way is to, by use the eye tracking arrangement as disclosed above, perform calibration of a particular position of the user's eyes, i.e., a particular gaze direction. The calibration point 20a is therefore within the images captured by the scene camera 11, although may not be within the field of view of the user. By way of example, consider a normalized first fixed coordinate system spanning between four corners having the coordinates (0.00, 0.00), (1.00, 0.00), (0.00, 1.00) and (1.00, 1.00) as the top left corner, top right corner, bottom left corner and bottom right corner, respectively. The coordinates of the calibration point 20a may be determined as any suitable value within these limits. In this example, the calibration point 20a is depicted as being within the first fixed coordinate system, but outside the second fixed coordinate system associated with the remote display device 30. In single-point calibration contexts, the calibration point 20a may be determined as having the coordinates (0.50, 0.50), i.e., generally in the center of the first fixed coordinate system. In five-point calibration contexts, a plurality of calibration points 20n may be determined generally in the center of the first fixed coordinate system, as well as near the center of the four quadrants of the first fixed coordinate system, i.e., generally around (0.50, 0.50), (0.25, 0.25), (0.25, 0.75), (0.75, 0.25), (0.75, 0.75), respectively. It is appreciated that different calibration procedures may have different calibration points in different positions, none of which are to be construed as limiting to the scope of the present disclosure. The calibration point 20a may be determined by processing circuitry of either one of the glasses 10, the remote display device 30, or the remote processing device as discussed herein.

At step 220, an initial gaze point 40a of the user wearing the glasses 10 is determined. The eyes of the user are shown in a first position p1. The initial gaze point 40a may correspond to a point in two or three dimensions. The initial gaze point 40a may be determined by mapping data obtained by the eye tracking arrangement including the eye cameras 12 and the illuminators 13 with data obtained by the scene camera 11. The mapping may be performed by applying any known gaze tracking algorithm known in the art, and may comprise determining at least one of a gaze direction of the user, a position of the user, and a viewing angle. The initial gaze point 40a may be determined periodically, for example at a frequency between 50 Hz and 240 Hz, and in more preferable examples between 90 and 110 Hz (40 Hz and 60 Hz interlaced), and in even more preferable examples 100 Hz (50 Hz interlaced). The term "interlaced" in this context refers to a display or video format that has a refresh rate of 50 Hz and uses interlacing to display the image. Interlacing is a technique where each frame is divided into two fields, and each field contains alternating lines of the image. In this format, the first field displays all the odd-numbered lines, and the second field displays all the even-numbered lines. The fields are then displayed sequentially to create the full image.

The determining step 220 may involve establishing the coordinates of the initial gaze point 40a in both of the first fixed coordinate system and the second fixed coordinate system. Before the initial gaze point 40a is determined, the user may be instructed to look at the remote display device 30. The instructions to look at the remote display device 30 may be triggered by either the remote display device 30, the glasses 10, and/or possibly the remote processing device disclosed above. The instructions to look at the remote display device 30 may involve one of a visual instruction, an audio instruction or a haptic cue. The instructions to look at the remote display device 30 may be automatically triggered, for example when the user opens a calibration application on the remote display device.

Once the user is directing their gaze at the remote display device 30, the initial gaze point 40a is established in the first fixed coordinate system. By way of example, consider the first fixed coordinate system disclosed above, i.e., spanned by the coordinates (0.00, 0.00), (1.00, 0.00), (0.00, 1.00) and (1.00, 1.00). The initial gaze point 40a may be determined as a position anywhere within these limits, e.g. (0.20, 0.87), (0.74, 0.08), (0.45, 0.55), and so forth, corresponding to the location where the remote display device 30 is located. To this end, the initial gaze point 40a corresponds to a part of the environment that the scene camera 11 has captured in the images. Moreover, since the relation between the first and second fixed coordinate systems is known from the images captured by the scene camera 11 (because of the fact that the images include the remote display device 30 and consequently the second fixed coordinate system associated therewith), the initial gaze point 40a with respect to the first fixed coordinate system may be mapped onto the second fixed coordinate system.

Once the calibration point 20a and the initial gaze point 40a have been determined, their relative positions can be calculated. Further seen in FIG. 3A is the first direction 32 and the first distance 34 from the initial gaze point 40a to the calibration point 20a. The calculating step 230 of the first direction 32 and the first distance 34 is determined based on the coordinates of the calibration point 20a and the initial gaze point 40a being determined with respect to the first fixed coordinate system.

The first direction 32 may be calculated by an arctangent function, or other suitable angle functions such as dot product or cross product of vectors. In addition, the normalized values may be adjusted for the aspect ratio of the scene camera 11. One way of doing this is to provide the function input parameters of the width and height of the scene camera 11 in pixels, i.e., for a full HD scene camera 11 this would be 1920 (width) and 1080 (height). Using the atan2 function the first direction 32 can accordingly be calculated by the following formula:

angle = $a$tan2((targetY ∗ height) −

(gazeY ∗ height), (targetX ∗ width) − (gazeX ∗ width)), where angle is the first direction 32, targetY and targetX are the coordinates of the calibration point 20a, gazeY and gazeX are the coordinates of the initial gaze point 40a, and height and width correspond to the aspect ratio of the scene camera 11.

The first distance 34 may be calculated by any known distance function such as a normal or squared distance function. Using a distance function the first distance 34 can accordingly be calculated by the following formula:

distance = $sqrt$((targetX − gazeX)² + (targetY − gazeY)²), where distance is the first distance 34, targetX and targetY are the coordinates of the calibration point 20a, and gazeX and gazeY are the coordinates of the initial gaze point 40a.

In relation to step 240, a calibration marker 40 is displayed on the remote display device 30 at the position of the initial gaze point 40a. As discussed above, the calibration marker 40 indicates the first direction 32. In this example, the first direction 32 is indicated by an arrow pointing towards the calibration point 20a. Moreover, although purely optional, the first distance 34 may be indicated, for example by displaying the numerical distance or, as will be explained below, by the size of the arrow. As the calibration marker 40 is configured to indicate the first direction 32 from the initial gaze point 40a towards the calibration point 20a, the user will be provided with visual feedback of how the subsequent relative movement should be performed in order to reach the calibration point 20a with the gaze point.

The calibration marker 40 may be any suitable visual indication that can serve as guidance for the user into causing further relative movement. For example, the calibration marker 40 may be an arrow icon pointing towards the calibration point 20a. Other examples include letters (such as "left" or "right"), lines, optionally dotted and/or curved, indicating a direction, connective symbols, flow lines, gradients or color transitions, pathway markers or any alternative calibration marker known in the art. In examples where the calibration marker 40 also indicates the first distance 34, this may be given in the form of an additional and/or alternative visual indication. Such examples include a calibration marker 40 of varying size depending on the distance, letters indicating the first distance (such as "30 cm"), or other exemplary calibration markers indicating a distance known in the art. By way of example, the arrow may become gradually smaller as the first distance 34 becomes smaller, and the arrow may become gradually larger as the first distance 34 becomes larger.

In addition to the calibration marker 40, the user may be provided with additional feedback for signalling the first distance or first direction. Such additional feedback may be haptic feedback, visual feedback or audio feedback. The additional feedback may be provided by the glasses 10, the remote display device 10, and/or any additional device part of the eye tracking system 100.

This is where the guiding is taking place, i.e., the steps carried out such that the user may be guided in calibrating the glasses 10. The calibration marker 40 may guide or prompt the user to cause a relative movement between the gaze point and the calibration point 20a. This can be accomplished by movement of the user's head while wearing the glasses 10 and/or movement of the remote display device 30. Movement of the remote display device 30 is preferably caused by the user holding the remote display device 30 in its hand and moving said remote display device 30 in accordance with the guiding instructions provided by the calibration marker 40. The user may accordingly carry out the calibration procedure without requiring an instructor. The determining 250, calculating 252 and updating 254 steps are performed in response to the relative movement between the gaze point and the calibration point 20a. The determining 250 and the calculating 252 steps may be carried out similar to the determining step 210 and the calculating step 230, respectively, but with different inputs due to the relative movement between the gaze point and the calibration point 20a. More specifically, the inputs that will differ are the coordinates of the gaze point in the first fixed coordinate system. This is as consequence of the user being guided with its gaze to different locations with respect to the first fixed coordinate system. The three different approaches of the guiding as discussed above will now be explained in more detail.

Using the "head still, device moving" approach, a plurality of consecutive images captured by the scene camera 11 will largely remain the same as each other during the calculating step 230 of the first distance/direction and the calculating step 252 of the second distance/direction. This is due to the fact that the user's head remains generally still, so the scene camera 11 will capture a plurality of consecutive images of the environment from generally the same point of view, with some potential error margin for accidental movement(s). Such accidental movement(s) may be due to the user not being able to hold the phone still. However, since the remote display device 30 is being moved within the first fixed coordinate system associated with the images captured by the scene camera 11, the relative position of the remote display device 30 will change with respect to the first fixed coordinate system. As the user is instructed to maintain their gaze at the calibration marker 40 (which remains in a fixed position on the remote display device), the current gaze point 40b of the user will also change with respect to the first fixed coordinate system. At the same time, the current gaze point 40b will substantially remain the same in the second fixed coordinate system.

Using the "head moving, device still" approach, the plurality of consecutively captured images captured by the scene camera 11 will differ from each other. This is due to the fact that the head of the user moves, and so will the scene camera 11 of the glasses 10. Accordingly, the field of view of the scene camera 11 will change in response to the head movement. The coordinates of the calibration point 20a with respect to the first fixed coordinate system are fixed, as discussed above. In this case, as the user is instructed to maintain their gaze at the calibration marker 40 and the remote display device 30 remains substantially still, for instance by the user holding the remote display device 30 in place, the coordinates of the current gaze point 40b with respect to the first fixed coordinate system change as the user moves their head. At the same time, the current gaze point 40b will substantially remain the same in the second fixed coordinate system since the user is instructed to remain its gaze on the calibration marker 40 displayed thereon.

The "head moving, device moving" approach is a combination of the two approaches discussed above. The images captured by the scene camera 11 will change for the same reason as the "head moving, device still" approach, i.e., due to movement of the scene camera 11. Moreover, the plurality of consecutively captured images will also differ in a similar way as the "head still, device moving" approach, i.e., the remote display device 30 will move in relation to the user's head and thus be differently positioned with respect to the first fixed coordinate system. The techniques discussed above can be equally applied here.

In each of the approaches above, a relative movement of the current gaze point 40b and the calibration point 20a is caused by the movement of the user's head while wearing the glasses 10 and/or movement of the remote display device.

Figure 3B:
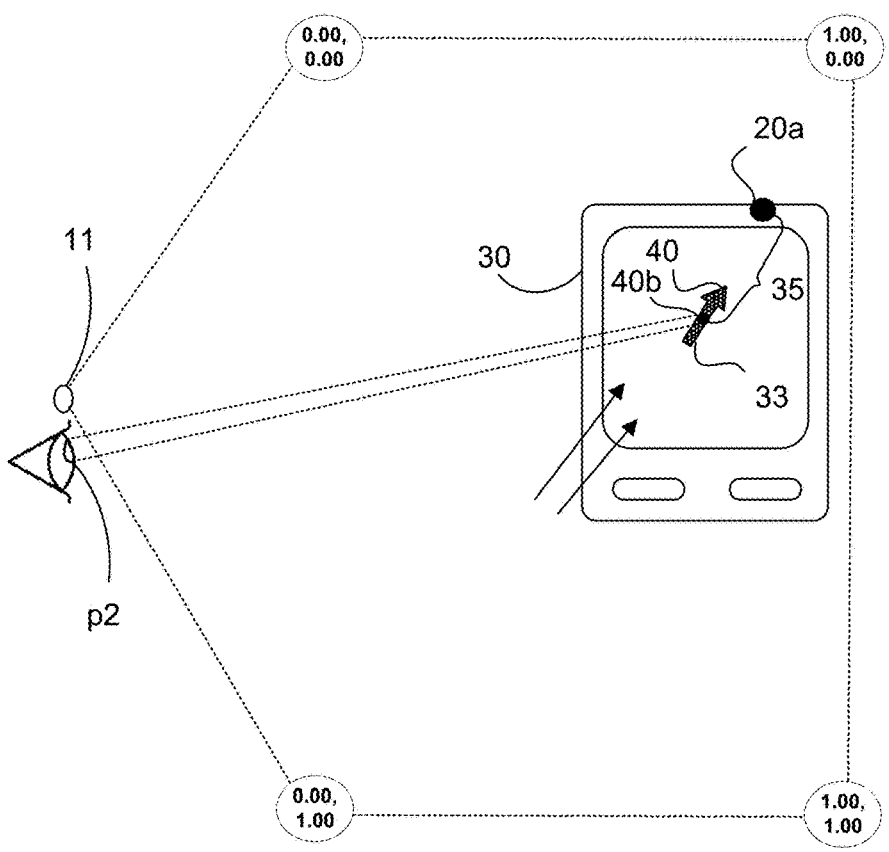

With reference to FIG. 3B, a relative movement between the calibration point 20a and the initial gaze point 40a has been caused. The gaze origin of the user has thus changed from the first position p1 to a second position p2, where the second position p2 is associated with a different current gaze point 40b. The relative movement has been caused by movement of the remote display device 30 in a direction indicated by the first direction 32. Consequently, the calibration marker 40 has been updated such that it is configured to indicate a second direction 33, and in this case also a second distance 35. The second distance 35 is shorter than the first distance 34, and the second direction 33 is substantially the same as the first direction 32. However, the appearance of the calibration marker 40 has changed, shown in this example by resizing the arrow, and changing a color/fill pattern of the arrow. These appearance changes indicate that the calibration marker 40 is approaching the calibration point 20a.

The updating step 254 of the calibration marker 40 is carried out such that the user will be given feedback of the current direction, and optionally the current distance, between the calibration marker 40 and the calibration point 20a. The feedback is given without the user requiring knowledge of the position of the calibration point 20a in advance, so the user may simply follow the indications given by the calibration marker 40 and consequently be guided in the calibration of the glasses 10. This allows for an improved guidance that at least alleviates one or more of the deficiencies mentioned in the background section.

In some examples, the updating step 254 comprises changing an appearance of the calibration marker 40 depending on a change in the second direction 33 and/or the second distance 35. The appearance change shall in this context be interpreted as any visually distinguishable change that affects how the calibration marker 40 appears to the user.

In some examples, changing the appearance of the calibration marker 40 involves reducing a size thereof upon the second distance 35 being smaller than the first distance 34. This may occur in response to the current gaze point 40b approaching the calibration point 20a. Moreover, in these examples, changing the appearance of the calibration marker 40 involves and enlarging the calibration marker 40 upon the second distance 35 being larger than the first distance 34. Correspondingly, this may occur in response to the current gaze point 40b departing from the calibration point 20a. Alternatively or additionally, changing the appearance of the calibration marker 40 involves recoloring the calibration marker 40 upon the second distance 35 being different from the first distance 34. In some examples, the calibration marker 40 will be recolored into a more positively interpreted color, such as green, upon the current gaze point 40b approaching the calibration point 20a. Conversely, in these examples, the calibration marker 40 will be recolored into a more negatively interpreted color, such as red, upon the current gaze point 40b departing from the calibration point 20a. The appearance change of the calibration marker 40 is particularly advantageous due to the fact that the user may directly interpret what steps need to be taken in order to correctly calibrate the glasses 10. The appearance change of the calibration marker 40 may thus eliminate the need for an instructor to assist the user in, for example, viewing a live stream of images captured by the scene camera, physically holding calibration markers in front of the user, or physically maintaining the user's head fixed in position.

Figure 3C:
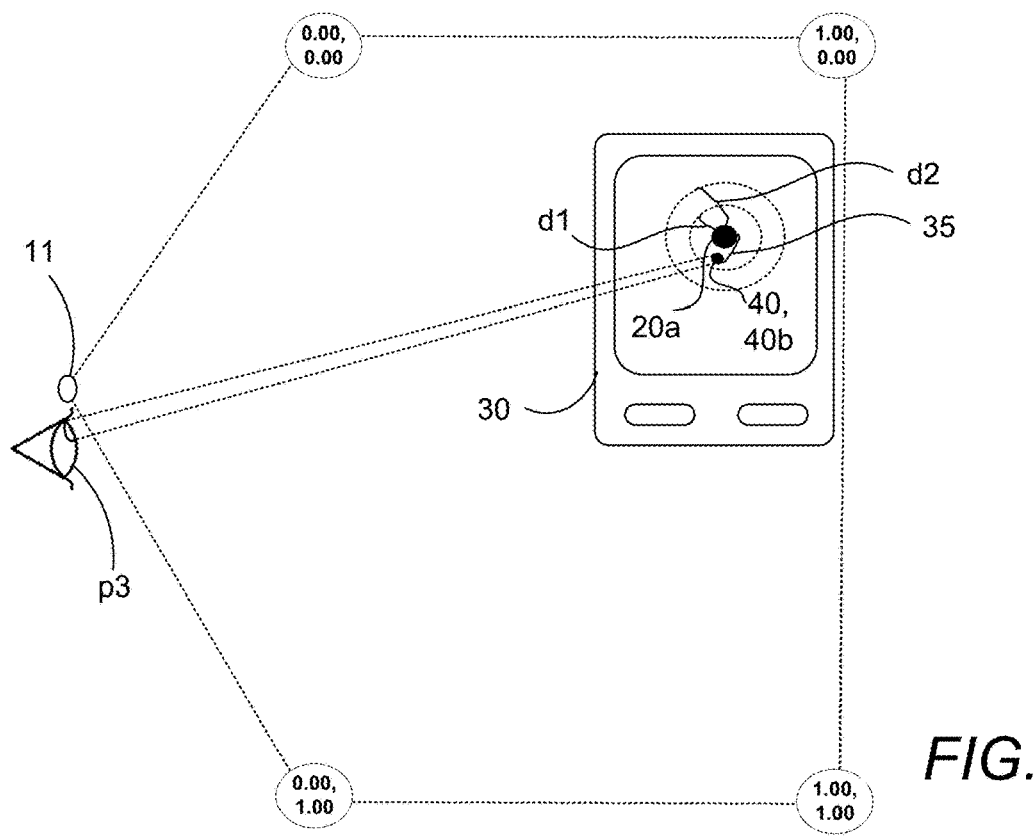

With further reference to FIG. 3C, the remote display device 30 has been further moved according to the indication provided by the calibration marker 40. The gaze origin of the user has thus changed to a third position p3 since the current gaze point 40b has followed the remote display device 30. The current gaze point 40b is now within a calibration distance d1 (alternatively interpreted as a threshold distance or uncertainty factor) of the calibration point 20a, i.e., the second distance 35 is shorter than the calibration distance d1 of the calibration point 20a. The calibration distance d1 defines a distance required to trigger the calibration of the glasses 10 with respect to the calibration point 20a. The current gaze point 40b of the user has accordingly been guided into a range sufficiently small to trigger the calibration of the glasses 10 respect to the calibration point 20a. This depicted is in FIG. 3C by a change of the graphical icon being the arrow into a point.

The calibration may now be carried out with respect to the calibration point 20a at step 260. As illustrated in FIG. 3C, the calibration may depend on the user's gaze being maintained within a calibration margin d2 of the calibration distance d1 until a predetermined condition is met. The calibration margin d2 takes into account natural movement of the eye such that the calibration procedure of the calibration point 20a can still be carried out.

The calibration distance d1, calibration margin d2, and the predetermined condition may vary depending on different circumstances, such as a desired accuracy of the calibration, a type of eye tracking device being calibrated, characteristics of the user's eyes, and so forth. In some examples, the calibration distance d1 and the calibration margin d2 are different radiuses of substantially circular shapes having their respective centers at the calibration point 20a, which is shown in the example of FIG. 3C. Other exemplary calibration distances and/or calibration margins may be realized, such as a line extending from the calibration point 20a having a predetermined length or a distance from a center of any geometrical shape, the center being located at the calibration point 20a, to its circumferential line.

The predetermined condition may be a number of frames captured by the scene camera 11 and/or a fixation time. In the context of eye tracking, a fixation time refers to the duration of time that a user's gaze remains fixated or focused on a specific object or location, in this case the calibration point 20a. It represents the period during which the eyes are relatively stable and stationary, allowing for detailed visual processing of the observed stimulus. To this end, the calibration may require the user's gaze to be maintained within the calibration margin d2 of the calibration distance d1 until a certain number of frames have been captured, or until a certain time period has elapsed.

Figure 3D:
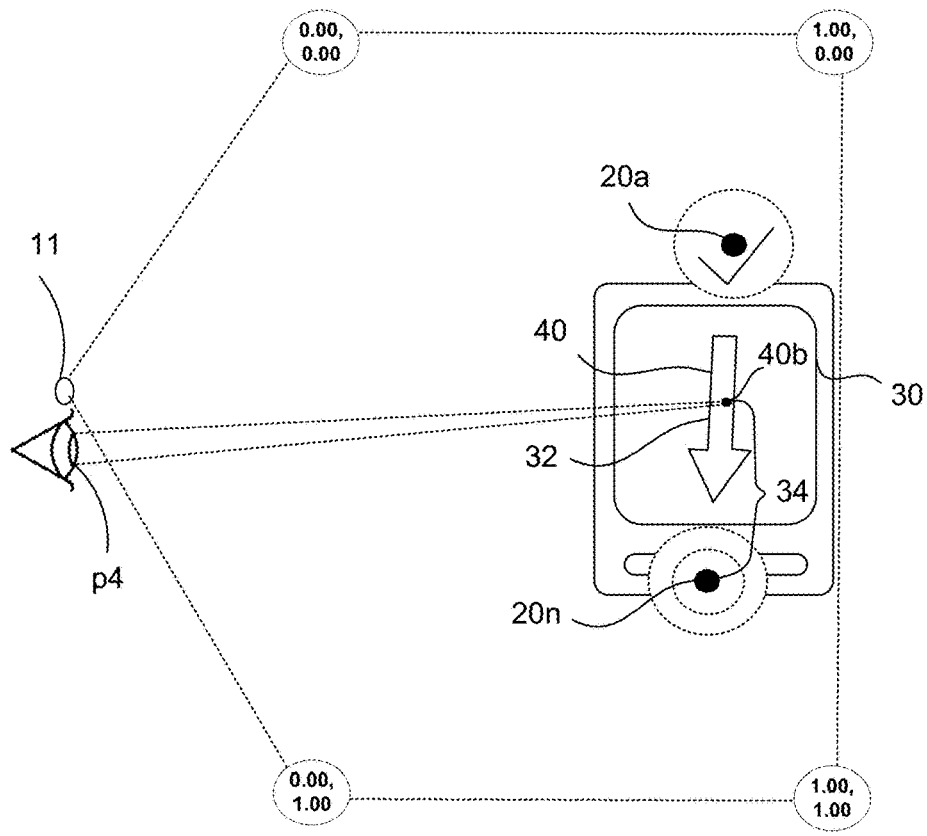

FIG. 3D shows a subsequent step of the guiding procedure. The gaze origin of the user are in a fourth position p4. The glasses 10 have been successfully calibrated with respect to the calibration point 20a, and an additional calibration point 20n has been determined, for example using the same techniques as were used in the determining of the calibration point 20a. The relevant steps of the method 200 can be repeated such that a multi-point calibration is realized in accordance with the details as explained in the present disclosure, with the advantage that the user's current gaze point 40b can at all times remain at the calibration marker 40.

Figure 4E:
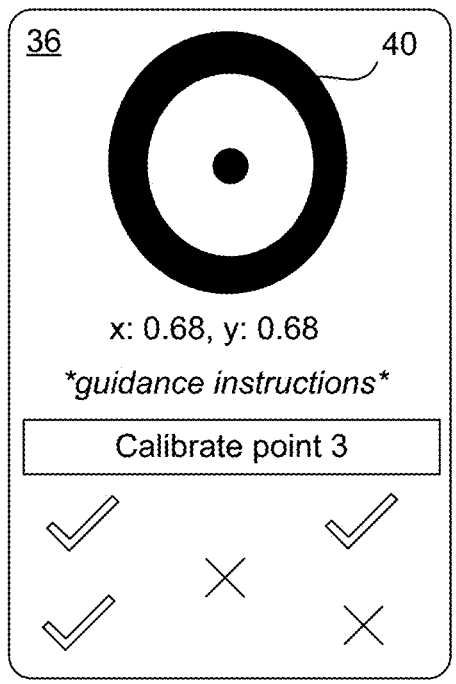
Figure 4F:
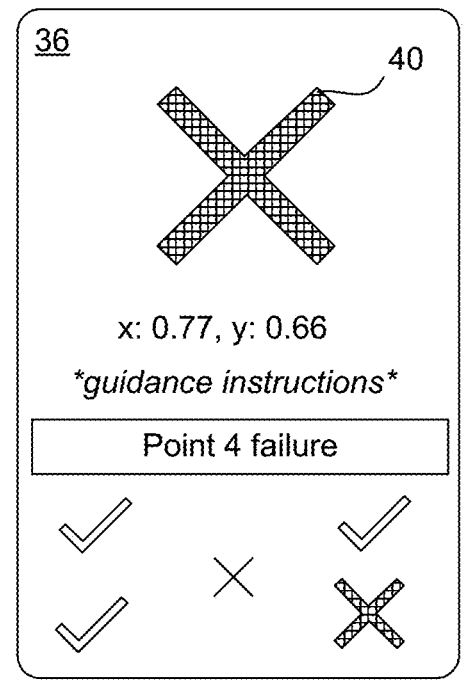
Figure 4G:
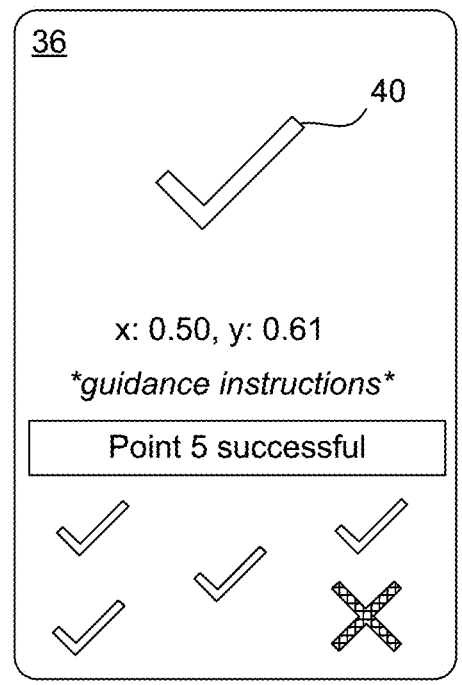
Figure 4H:
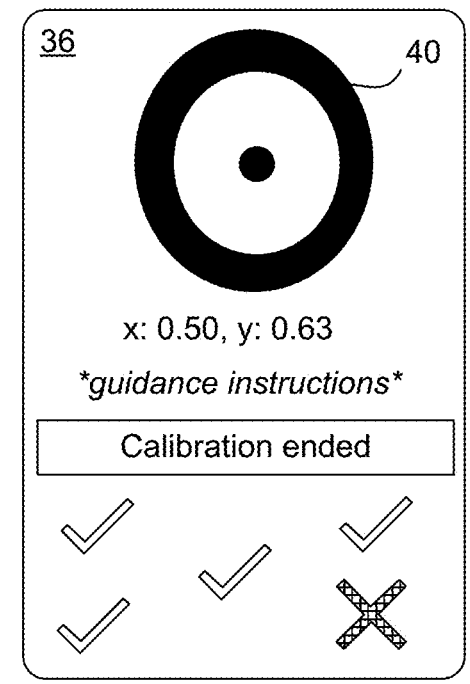

With reference to FIGS. 4A-H, an exemplary graphical user interface of a remote display device 30 is shown at the display 36 thereof. This particular illustration is a five-point calibration. This is an illustration of how the user may be presented with visual cues for the guiding procedure. The display 36 shows how the calibration marker 40 can be updated in response to movements of the gaze point in relation to a calibration point, shown as "X". For example, FIG. 4A shows that the gaze point is located at coordinates x: 0.47, y: 0.59 with respect to the first fixed coordinate system associated with the scene camera 11. The bottom view of the display 36 shows how the calibration progresses along the guiding procedure, i.e., where each icon in the bottom view of the display 36 represents a particular calibration point.

In FIG. 4A, the guiding procedure is commenced. The user will direct its gaze at the calibration marker 40 which is not indicative of any particular direction or distance. In FIG. 4B, a distance and a direction from the gaze point to the calibration point has been determined, and the calibration marker 40 is accordingly updated to display an arrow pointing in the detected direction. This is a guidance towards a first calibration point, which in this case is the top right calibration point. In FIG. 4C, the calibration of the first calibration point is completed, so the calibration marker 40 has changed into a completion icon, and the bottom view has been updated accordingly, by changing the X-icon into a checkmark icon. In FIG. 4D, a second calibration point has been determined, and the calibration marker 40 is accordingly updated with updated direction and distance indications. FIGS. 4E-4H further show various upcoming steps during the guiding procedure. Note that not all of the steps are shown (such as calibration of point 2) for reasons of brevity. The skilled person will appreciate that the guiding and calibration is carried out in accordance with the subject matter of the present disclosure. Finally, in FIG. 4H, the calibration is ending, and four out of five calibration points have successfully been calibrated, and calibration of one calibration point has failed, as indicated by the bottom view of the display 36.

Figure 5:
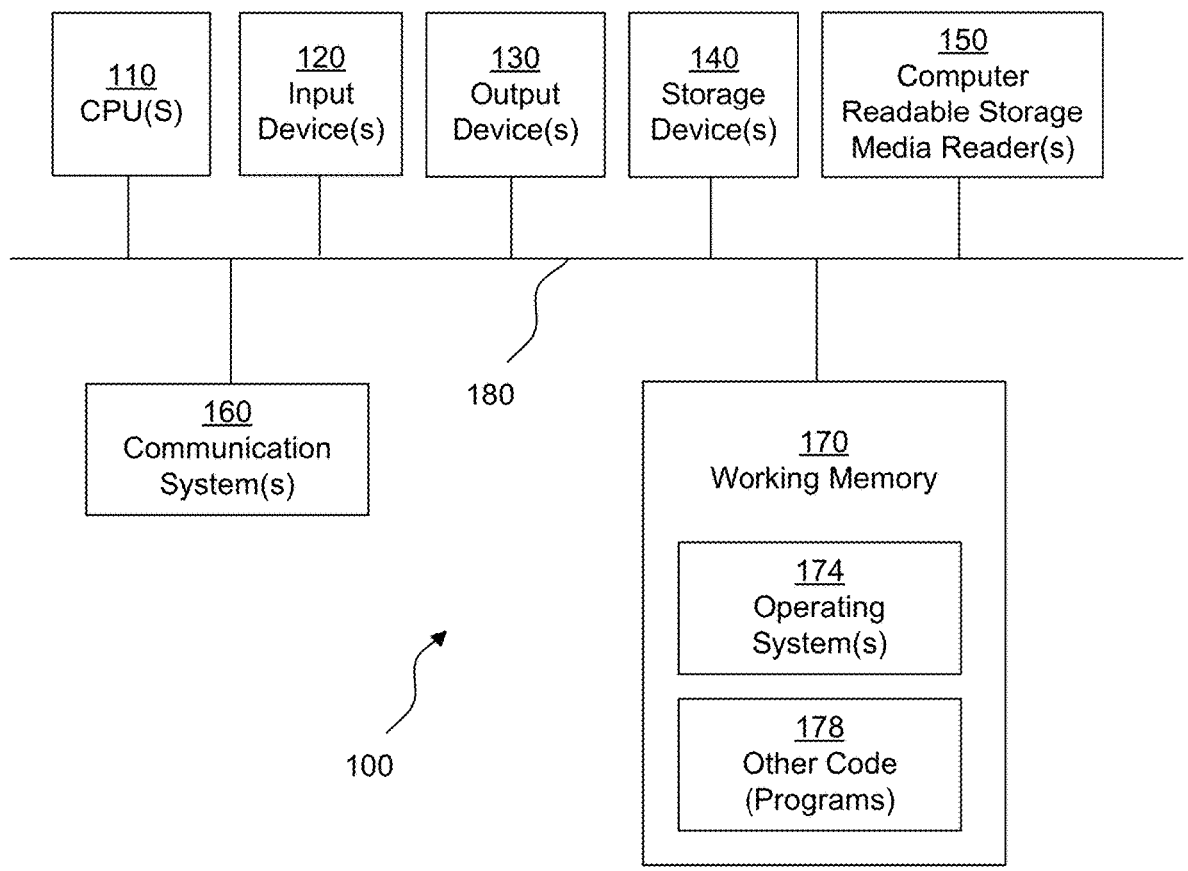
FIG. 5 is an exemplary block diagram of components that may be included in an exemplary computer system.

FIG. 5 is a block diagram illustrating an exemplary computer system 100 in which embodiments of the present invention may be implemented. This example illustrates a computer system 100 such as may be used, in whole, in part, or with various modifications, to provide the functions of the glasses 10, remote display device 30, remote processing device, processing circuitry, and/or other components of the invention such as those discussed above. For example, various functions of the computing device may be controlled by the computer system 100, including, merely by way of example, determining the gaze point of the user, presenting the calibration marker 40 on the remote display device 30, providing feedback to the user, etc.

The computer system 100 is shown comprising hardware elements that may be electrically coupled via a bus 180. The hardware elements may include one or more central processing units 110, one or more input devices 120 (e.g., a mouse, a keyboard, eye tracking device, etc.), and one or more output devices 130 (e.g., a display device, a printer, etc.). The computer system 100 may also include one or more storage device 140. By way of example, storage device(s) 140 may be disk drives, optical storage devices, solid-state storage device such as a random access memory ("RAM") and/or a read-only memory ("ROM"), which can be programmable, flash-updateable and/or the like.

The computer system 100 may additionally include a computer-readable storage media reader 150, a communications system 160 (e.g., a modem, a network card (wireless or wired), an infra-red communication device, Bluetooth™ device, cellular communication device, etc.), and working memory 170, which may include RAM and ROM devices as described above. In some embodiments, the computer system 100 may also include a processing acceleration unit (not shown), which can include a digital signal processor, a special-purpose processor and/or the like.

The computer-readable storage media reader 150 can further be connected to a computer-readable storage medium, together (and, optionally, in combination with storage device(s) 140) comprehensively representing remote, local, fixed, and/or removable storage devices plus storage media for temporarily and/or more permanently containing computer-readable information. The communications system 160 may permit data to be exchanged with a network, system, computer and/or other component described above.

The computer system 100 may also comprise software elements, shown as being currently located within a working memory 170, including an operating system 174 and/or other code 178. It should be appreciated that alternate embodiments of a computer system 100 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 100 may include code 178 for implementing any or all of the function of the various elements of the architecture as described herein. For example, software, stored on and/or executed by a computer system such as system 100, can provide the functions of the computing device, eye tracking device, processors, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

The invention claimed is:

1. A computer-implemented method for guiding a user in calibrating a wearable eye tracking device, the method comprising:
    determining a calibration point in a first fixed coordinate system associated with a scene camera of the eye tracking device;
    determining an initial gaze point of a user wearing the eye tracking device, the initial gaze point being determined in the first fixed coordinate system, and being determined in a second fixed coordinate system associated with a remote display device when the second fixed coordinate system overlaps with the first fixed coordinate system;
    calculating a first direction and a first distance from the initial gaze point to the calibration point in the first fixed coordinate system;
    displaying a calibration marker on the remote display device at the initial gaze point, wherein the calibration marker is configured to indicate the first direction;
    in response to a movement of the gaze point in relation to the calibration point caused by movement of the user's head while wearing the eye tracking device and/or movement of the remote display device:
        determining a current gaze point in the first fixed coordinate system;
        calculating a second direction and a second distance from the current gaze point to the calibration point in the first fixed coordinate system; and
        updating the calibration marker in accordance with the second direction and/or the second distance.

2. The method of claim 1, wherein updating the calibration marker comprises changing an appearance of the calibration marker depending on a change in the second direction and/or the second distance.

3. The method of claim 2, wherein changing the appearance of the calibration marker comprises:
    reducing a size of the calibration marker upon the second distance being smaller than the first distance, and enlarging the calibration marker upon the second distance being larger than the first distance; and/or
    recoloring the calibration marker upon the second distance being different from the first distance.

4. The method of claim 2, wherein changing the appearance of the calibration marker comprises changing a graphical icon of the calibration marker upon the second distance being within a calibration distance of the calibration point.

5. The method of claim 3, wherein changing the appearance of the calibration marker comprises changing a graphical icon of the calibration marker upon the second distance being within a calibration distance of the calibration point.

6. The method of claim 1, further comprising, in response to the movement of the gaze point in relation to the calibration point, providing additional feedback to the user, said additional feedback being one or more of: a haptic feedback, a visual feedback, or an audio feedback in accordance with the second direction and/or the second distance.

7. The method of claim 1, further comprising performing a calibration of the eye tracking device with respect to the calibration point upon the second distance being within a calibration distance of the calibration point.

8. The method of claim 7, wherein performing the calibration depends on the user's gaze being maintained within a calibration margin of the calibration distance until a predetermined condition is met.

9. The method of claim 8, wherein the calibration distance and the calibration margin are different radiuses of substantially circular shapes having their respective centers at the calibration point.

10. The method of claim 8, wherein the predetermined condition is a number of frames captured by a scene camera of the eye tracking device and/or a fixation time.

11. The method of claim 9, wherein the predetermined condition is a number of frames captured by a scene camera of the eye tracking device and/or a fixation time.

12. The method of claim 7, further comprising, as a response to performing the calibration of the eye tracking device with respect to the calibration point, for one or more consecutive calibration points:
    calculating a next direction and a next distance from the current gaze point to one of the consecutive calibration points; and
    updating the calibration marker in accordance with the next direction and/or the next distance.

13. The method of claim 12, further comprising determining a user calibration profile of the user of the eye tracking device as a result of performing the calibration of the calibration point and the one or more consecutive calibration points.

14. The method of claim 1, wherein the user's head remains substantially fixed while wearing the eye tracking device.

15. The method of claim 1, wherein the eye tracking device is a display-less eye tracking device.

16. A non-transitory computer-readable storage medium having stored thereon computer-executable instructions that, when executed by processing circuitry cause the processing circuitry to carry out the method according to claim 1.

17. An eye tracking system comprising a wearable eye tracking device, a remote display device, processing circuitry and a memory containing instructions executable by said processing circuitry, wherein the eye tracking device comprises a scene camera and an eye tracking camera, wherein the processing circuitry is configured to:
- determine a calibration point in a first fixed coordinate system associated with the scene camera;
- determine an initial gaze point of a user wearing the eye tracking device using the eye tracking camera and the scene camera, the initial gaze point being determined in the first fixed coordinate system, and being determined in a second fixed coordinate system associated with the remote display device when the second fixed coordinate system overlaps with the first fixed coordinate system;
- calculate a first direction and a first distance from the initial gaze point to the calibration point in the first fixed coordinate system;
- cause the remote display device to display a calibration marker at the initial gaze point, wherein the calibration marker is configured to indicate the first direction;
- in response to a movement of the gaze point in relation to the calibration point caused by movement of the user's head while wearing the eye tracking device and/or movement of the remote display device:
  - determine a current gaze point in the fixed coordinate system;
  - calculate a second direction and a second distance from the current gaze point to the calibration point in the first fixed coordinate system; and
  - cause the remote display device to update the calibration marker in accordance with the second direction and/or second distance.

18. The eye tracking system of claim 17, wherein the wearable eye tracking device is a display-less eye tracking device.

19. The eye tracking system of claim 18, wherein the wearable eye tracking device comprises a frame, at least one lens attached to the frame, an outward-facing image sensor and an eye tracking arrangement.

20. The eye tracking system of claim 19, wherein the remote display device is a smartphone, a tablet, a smartwatch, a laptop or a device capable of displaying information.

* * * * *